(12) United States Patent
Buendgen et al.

(10) Patent No.: US 12,130,953 B2
(45) Date of Patent: Oct. 29, 2024

(54) SECURE GUEST IMAGE AND METADATA UPDATE

(71) Applicant: INTERNATIONAL BUSINESS MACHINES CORPORATION, Armonk, NY (US)

(72) Inventors: Reinhard Theodor Buendgen, Baden-Wuerttemberg (DE); Jonathan D. Bradbury, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 457 days.

(21) Appl. No.: 17/395,089

(22) Filed: Aug. 5, 2021

(65) Prior Publication Data

US 2023/0040577 A1 Feb. 9, 2023

(51) Int. Cl.
| | | |
|---|---|---|
| G06F 21/70 | (2013.01) | |
| G06F 21/57 | (2013.01) | |
| G06F 21/64 | (2013.01) | |
| G06F 21/71 | (2013.01) | |
| H04L 9/08 | (2006.01) | |
| H04L 9/32 | (2006.01) | |
| G06F 9/455 | (2018.01) | |

(52) U.S. Cl.
CPC ............ *G06F 21/71* (2013.01); *G06F 21/572* (2013.01); *G06F 21/64* (2013.01); *H04L 9/0819* (2013.01); *H04L 9/3271* (2013.01); *G06F 9/45558* (2013.01); *G06F 2009/45575* (2013.01); *G06F 2221/033* (2013.01)

(58) Field of Classification Search
CPC ........ G06F 21/71; G06F 21/572; G06F 21/64; G06F 9/45558; G06F 2009/45575; G06F 2221/033; G06F 21/57; G06F 21/53; H04L 9/0819; H04L 9/3271
See application file for complete search history.

(56) References Cited

U.S. PATENT DOCUMENTS

| | | | |
|---|---|---|---|
| 10,303,899 B2 | 5/2019 | Durham et al. | |
| 10,628,612 B2 | 4/2020 | Durham et al. | |
| 10,771,263 B2 | 9/2020 | Smith et al. | |
| 11,354,421 B2 | 6/2022 | Buendgen et al. | |

(Continued)

FOREIGN PATENT DOCUMENTS

| | | |
|---|---|---|
| TW | 202038114 A | 10/2020 |
| TW | 202101266 A | 1/2021 |

OTHER PUBLICATIONS

IBM, "z/Architecture—Principles of Operation," IBM Publication No. SA22-7832-12, Thirteenth Edition, Sep. 2019, pp. Jan. 2000.

(Continued)

*Primary Examiner* — Izunna Okeke
(74) *Attorney, Agent, or Firm* — Edward J. Wixted, III, Esq.; Blanche E. Schiller, Esq.; Heslin Rothenberg Farley & Mesiti P.C.

(57) ABSTRACT

A secure guest generates an updated image for the secure guest, and computes one or more measurements for the updated image. The secure guest provides the one or more measurements to a trusted execution environment and obtains from the trusted execution environment metadata for the updated image. The metadata is generated based on metadata of the secure guest and obtaining the one or more measurements.

25 Claims, 12 Drawing Sheets

(56) References Cited

U.S. PATENT DOCUMENTS

| | | |
|---|---|---|
| 11,500,988 B2 | 11/2022 | Buendgen et al. |
| 2009/0100420 A1 | 4/2009 | Sapuntzakis et al. |
| 2013/0191643 A1 | 7/2013 | Song et al. |
| 2022/0114249 A1* | 4/2022 | Grancharov ............ G06F 21/53 |
| 2022/0222099 A1* | 7/2022 | Srivastava .......... G06F 9/45545 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

Anonymous, "Protecting Secrets in Docker Environments," IP.com No. IPCOM000262988D, Jul. 20, 2020, pp. 1-5 (+ cover).

Anonymous, "Fully Decentralized Cloud Using Generalized Trusted Execution Environments and Distributed Hash Tables (Without Blockchain)," IP.com No. IPCOM000264923D, Feb. 5, 2021, pp. 1-6 (+ cover).

Anonymous, "Secure Build and Policy Updates," IP.com No. IPCOM000263761D, Oct. 2, 2020, pp. 1-4 (+ cover).

AMD, "AMD's Virtualization Memory Encryption," KVM Forum 2016, Aug. 25, 2016, pp. 1-24.

Miller, Brett et al., "AWS Architecture and Security Recommendations for FedRAMP$^{SM}$" Dec. 2014, pp. 1-37.

Chase, Jeff et al., "Controlling Dynamic Guests in a Virtual Computing Utility," 2008 (no further date information available), pp. 1-8.

Notification of Transmittal of the International Search Report and the Written Opinion of the International Searching Authority or the Declaration, PCT/EP2022/071764, Nov. 15, 2022, 12 pages.

Sabt, Mohamed et al., "Trusted Execution Environment: What It Is, and What It Is Not," 2015 IEEE Trustcom/BigDataSE/ISPA, Aug. 1, 2015, pp. 57-64.

Wang, Wei et al., "Secured and Reliable VM Migration in Personal Cloud," 2010 $2^{nd}$ International Conference on Computer Engineering and Technology, Apr. 16, 2010, pp. V1-705-V1-709.

Zou, Deqing et al., "Constructing Trusted Virtual Execution Environment in P2P Grids," Future Generation Computer Systems, May 1, 2010, pp. 769-775.

EP Response to Rule 161, Application No. 22761124.1, dated Aug. 30, 2024, pp. 1-77.

\* cited by examiner

300

| | NAME | ABBREV | CONTENTS | PROTECTION |
|---|---|---|---|---|
| | REQUEST STRUCTURE TYPE | RHT | SG IMAGE UPDATE REQUEST | INTEGRITY |
| 302 | REQUEST STRUCTURE INITIALIZATION VALUE | RHIV | INITIALIZATION VALUE USED FOR AES-GCM ENCRYPTION OF REQUEST STRUCTURE | INTEGRITY |
| | # OF KEY SLOTS | NKS | | INTEGRITY |
| 318 | CUSTOMER PUBLIC KEY | CPK | CUSTOMER PUBLIC KEY (ECDH P521) | INTEGRITY |
| | KEY SLOT 1 | kslot1 | RPK WRAPPED FOR HOST 1 | INTEGRITY |
| 320 | ... | | | INTEGRITY |
| | KEYSLOT n | kslotn | RPK WRAPPED FOR HOST n | INTEGRITY |
| 322 | REQUEST FLAGS | RF | E.G., OPTION INDICATIONS LIKE CHALLENGE REQUIRED | ENCRYPTED |
| 324 | CHANGE INDICATION FLAGS | CIF | FLAGS DESCRIBING TYPES OF REQUIRED CHANGES | ENCRYPTED |
| | AUTHENTICATION DATA | AD | NONCE \| \| AES(oldCCK,NONCE) | OPTIONAL, ENCRYPTED |
| 326 | CHANGE DATA | CD | DATA SPECIFYING CHANGES | ENCRYPTED |
| | REQUEST STRUCTURE TAG | RST | AES-GCM TAG | N/A |

FIG. 3

GENERATE, BY A SECURE GUEST, AN UPDATED IMAGE FOR THE SECURE GUEST — 600

COMPUTE ONE OR MORE MEASUREMENTS FOR THE UPDATED IMAGE — 602

PROVIDE, BY THE SECURE GUEST, THE ONE OR MORE MEASUREMENTS TO A TRUSTED EXECUTION ENVIRONMENT — 604

OBTAIN FROM THE TRUSTED EXECUTION ENVIRONMENT METADATA FOR THE UPDATED IMAGE, THE METADATA GENERATED BASED ON METADATA OF THE SECURE GUEST AND OBTAINING THE ONE OR MORE MEASUREMENTS — 606

OBTAIN, BY THE SECURE GUEST, AN IMAGE UPDATE REQUEST STRUCTURE INDICATING THE UPDATED IMAGE IS TO BE GENERATED — 608

PROVIDE THE IMAGE UPDATE REQUEST STRUCTURE TO THE TRUSTED EXECUTION ENVIRONMENT — 610

OBTAIN FROM THE TRUSTED EXECUTION ENVIRONMENT, BASED ON THE IMAGE UPDATE REQUEST STRUCTURE, A REQUEST HANDLE — 612

— 614
THE REQUEST HANDLE TO BE USED IN GENERATING THE UPDATED IMAGE

THE GENERATING THE UPDATED IMAGE INCLUDES

USING THE REQUEST HANDLE TO REQUEST AN ENCRYPTION KEY FROM THE TRUSTED EXECUTION ENVIRONMENT — 616

618 —
    CONSTRUCTING AN UPDATED PLAIN TEXT IMAGE OF THE SECURE GUEST

ENCRYPTING THE UPDATED PLAIN TEXT IMAGE USING THE ENCRYPTION KEY TO OBTAIN AN ENCRYPTED IMAGE, THE ENCRYPTED IMAGE BEING THE UPDATED IMAGE — 620

THE COMPUTING THE ONE OR MORE MEASUREMENTS INCLUDES UPDATING, BASED ON THE ENCRYPTED IMAGE, ONE OR MORE INITIAL MEASUREMENTS OF THE UPDATED PLAIN TEXT IMAGE TO OBTAIN THE ONE OR MORE MEASUREMENTS PROVIDED TO THE TRUSTED EXECUTION ENVIRONMENT — 622

— 624
THE ONE OR MORE MEASUREMENTS ARE PROVIDED WITH THE REQUEST HANDLE

FIG. 6A

THE ENCRYPTION KEY IS A PROTECTED KEY OBTAINED FROM THE TRUSTED EXECUTION ENVIRONMENT ~630

THE PROTECTED KEY IS TO BE EXCLUSIVELY USED BY AN INSTANCE OF THE SECURE GUEST CALLING THE TRUSTED EXECUTION ENVIRONMENT AND A PLAIN TEXT VALUE OF THE ENCRYPTION KEY IS UNKNOWN TO THE SECURE GUEST ~632

THE UPDATED PLAIN TEXT IMAGE INCLUDES A PLURALITY OF PAGES OF MEMORY 634

THE ENCRYPTING THE UPDATED PLAIN TEXT IMAGE INCLUDES ENCRYPTING THE PLURALITY OF PAGES OF MEMORY USING THE PROTECTED KEY ~636

THE OBTAINING THE METADATA FOR THE UPDATED IMAGE IS BASED ON CALLING A FUNCTION AT THE TRUSTED EXECUTION ENVIRONMENT TO CREATE THE METADATA FOR THE UPDATED IMAGE ~638

THE CALLING PROVIDING AS ARGUMENTS THE REQUEST HANDLE AND THE ONE OR MORE MEASUREMENTS ~640

THE ARGUMENTS FURTHER INCLUDE OTHER METADATA OF THE UPDATED IMAGE ~642

THE IMAGE UPDATE REQUEST STRUCTURE IS INTEGRITY PROTECTED AND INCLUDES AN ENCRYPTED PART AND IS EXCLUSIVELY INTERPRETABLE BY THE TRUSTED EXECUTION ENVIRONMENT ~644

FIG. 6B

THE ENCRYPTED PART OF THE IMAGE UPDATE REQUEST STRUCTURE INCLUDES DATA DERIVED FROM CONFIDENTIAL DATA IN AN ENCRYPTED PART OF THE METADATA OF THE SECURE GUEST ISSUING AN IMAGE UPDATE REQUEST — 660

OBTAINING A CHALLENGE TO THE IMAGE UPDATE REQUEST STRUCTURE FROM THE TRUSTED EXECUTION ENVIRONMENT BASED ON PROVIDING THE IMAGE UPDATE REQUEST STRUCTURE TO THE TRUSTED EXECUTION ENVIRONMENT — 662

THE CHALLENGE BASED ON CONFIDENTIAL DATA OBTAINED FROM THE ENCRYPTED PART OF THE IMAGE UPDATE REQUEST — 664

OBTAINING, BY THE SECURE GUEST FROM A SELECTED ENTITY, A RESPONSE TO THE CHALLENGE — 666

PROVIDING FROM THE SECURE GUEST TO THE TRUSTED EXECUTION ENVIRONMENT THE RESPONSE TO THE CHALLENGE — 668

OBTAINING FROM THE TRUSTED EXECUTION ENVIRONMENT, BASED ON PROVIDING THE RESPONSE TO THE CHALLENGE, AN INDICATION OF WHETHER THE CHALLENGE WAS SUCCESSFUL — 670

CONTINUING WITH GENERATING THE UPDATED IMAGE BASED ON THE CHALLENGE BEING SUCCESSFUL — 672

THE IMAGE UPDATE REQUEST STRUCTURE INCLUDES ONE OR MORE INDICATIONS AND DATA THAT SPECIFY ONE OR MORE CHANGES TO PREVIOUS SECURE GUEST METADATA TO BE USED TO COMPUTE THE METADATA FOR THE UPDATED IMAGE — 674

STORING THE UPDATED IMAGE OF THE SECURE GUEST AND THE METADATA FOR THE UPDATED IMAGE TO A BOOT DEVICE — 676

FIG. 6C

SECURE GUEST IMAGE AND METADATA UPDATE

BACKGROUND

One or more aspects relate, in general, to facilitating processing within a computing environment, and in particular, to improving such processing.

A computing environment may support virtualization, in which a hypervisor or virtual machine manager of the computing environment hosts various guests, such as virtual machines or virtual servers of the computing environment. A virtual machine has access to system resources and may execute an operating system, such as a guest operating system. Different guests can be owned by different owners, and of these guests, some can be secure guests.

A traditional hypervisor has full control over the hosted guests. In particular, the hypervisor has the capability to inspect and even modify memory of the hosted guest. However, a secure guest is a guest that can be hosted by hypervisors that are not fully trustworthy. The image of such a secure guest would be protected when loaded and the protection of the contents of the resources assigned to the guest (e.g., memory, CPU registers) would be maintained throughout the lifetime of the guest. The protection of the guest includes at least integrity protection (e.g., hypervisor cannot maliciously change any guest states) and in addition can include maintaining the confidentiality of the initial image, code and data running in the secure guest.

Processing associated with secure guests, including images and/or metadata of the secure guests, is to be facilitated.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes generating, by a secure guest, an updated image for the secure guest, and computing one or more measurements for the updated image. The secure guest provides the one or more measurements to a trusted execution environment and obtains from the trusted execution environment metadata for the updated image. The metadata is generated based on metadata of the secure guest and obtaining the one or more measurements. By generating an updated secure guest image and obtaining metadata associated therewith for a running secure guest, changes may be made to the secure guest (e.g., applying security fixes, updating a configuration, etc.) that will be available to the secure guest at the next boot, providing flexibility and/or enhancements.

In one example, the secure guest obtains an image update request structure indicating the updated image is to be generated. The image update request structure is provided to the trusted execution environment, and a request handle is obtained from the trusted execution environment, based on the image update request structure. The request handle is to be used in generating the updated image.

In one example, the generating the updated image includes using the request handle to request an encryption key from the trusted execution environment, constructing an updated plain text image of the secure guest, and encrypting the updated plain text image using the encryption key to obtain an encrypted image. The encrypted image is the updated image.

As an example, the computing the one or more measurements includes updating, based on the encrypted image, one or more initial measurements of the updated plain text image to obtain the one or more measurements provided to the trusted execution environment. The one or more measurements are provided, for instance, with the request handle.

In one example, the encryption key is a protected key obtained from the trusted execution environment. The protected key is, for instance, to be exclusively used by an instance of the secure guest calling the trusted execution environment and a plain text value of the encryption key is unknown to the secure guest. Using a protected key provides security for the data and the processing.

As an example, the updated plain text image includes a plurality of pages of memory, and the encrypting the updated plain text image includes encrypting the plurality of pages of memory using the protected key.

In one example, the obtaining the metadata for the updated image is based on calling a function at the trusted execution environment to create the metadata for the updated image, and the calling provides as arguments the request handle and the one or more measurements. As an example, the arguments further include other metadata of the updated image.

As an example, the image update request structure is integrity protected, includes an encrypted part, and is exclusively interpretable by the trusted execution environment. The protection ensures that the request structure cannot be modified during the transmission from the secure guest to the trusted execution environment, that the data in the encrypted part of the request structure remains confidential during transmission and that plain text values of the encrypted data can only be accessed by the trusted execution environment.

In one example, the encrypted part of the image update request structure includes data derived from confidential data in an encrypted part of the metadata of the secure guest issuing an image update request. Using this data from the image update request structure the trusted execution environment can verify that the creator of the request structure has knowledge that is assumed to be exclusive to the owner of the secure guest image.

Further, in one example, a challenge to the image update request structure is obtained from the trusted execution environment based on providing the image update request structure to the trusted execution environment. The challenge is, for instance, based on confidential data obtained from an encrypted part of the image update request structure. The secure guest obtains from a selected entity, a response to the challenge, and provides to the trusted execution environment the response to the challenge. Based on providing the response to the challenge, an indication of whether the challenge was successful is obtained from the trusted execution environment. Based on the challenge being successful, continuing with generating the updated image. The challenge protects against vulnerabilities against the image update request structure.

In one example, the image update request structure includes one or more indications and data that specify one or more changes to previous secure guest metadata to be used to compute the metadata for the updated image.

As an example, the updated image of the secure guest and the metadata for the updated image are stored to a boot device. This enables the updated image and metadata to be available during a boot process.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3 depicts one example of a description relating to an image update request structure used in accordance with one or more aspects of the present invention;

FIGS. 6A-6C depict one example of facilitating processing within a computing environment, in accordance with one or more aspects of the present invention;

DETAILED DESCRIPTION

In accordance with one or more aspects of the present invention, a capability is provided to facilitate processing within a computing environment. As an example, the capability includes enabling a secure guest to create an updated image for the secure guest, as well as updated metadata for the updated secure guest image. This may be useful, for instance, in applying security fixes that affect the secure guest image, in customizing a generic secure guest image with confidential data belonging to a new owner of the customized secure guest image, and/or for other reasons. As used herein, an updated image or updated metadata refers to an updated image or a new image or metadata. The term "updated" is used for convenience.

One embodiment of a computing environment to incorporate and use one or more aspects of the present invention is described with reference to FIG. 1. As an example, the computing environment is based on the z/Architecture® instruction set architecture, offered by International Business Machines Corporation, Armonk, New York One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Figure 1:
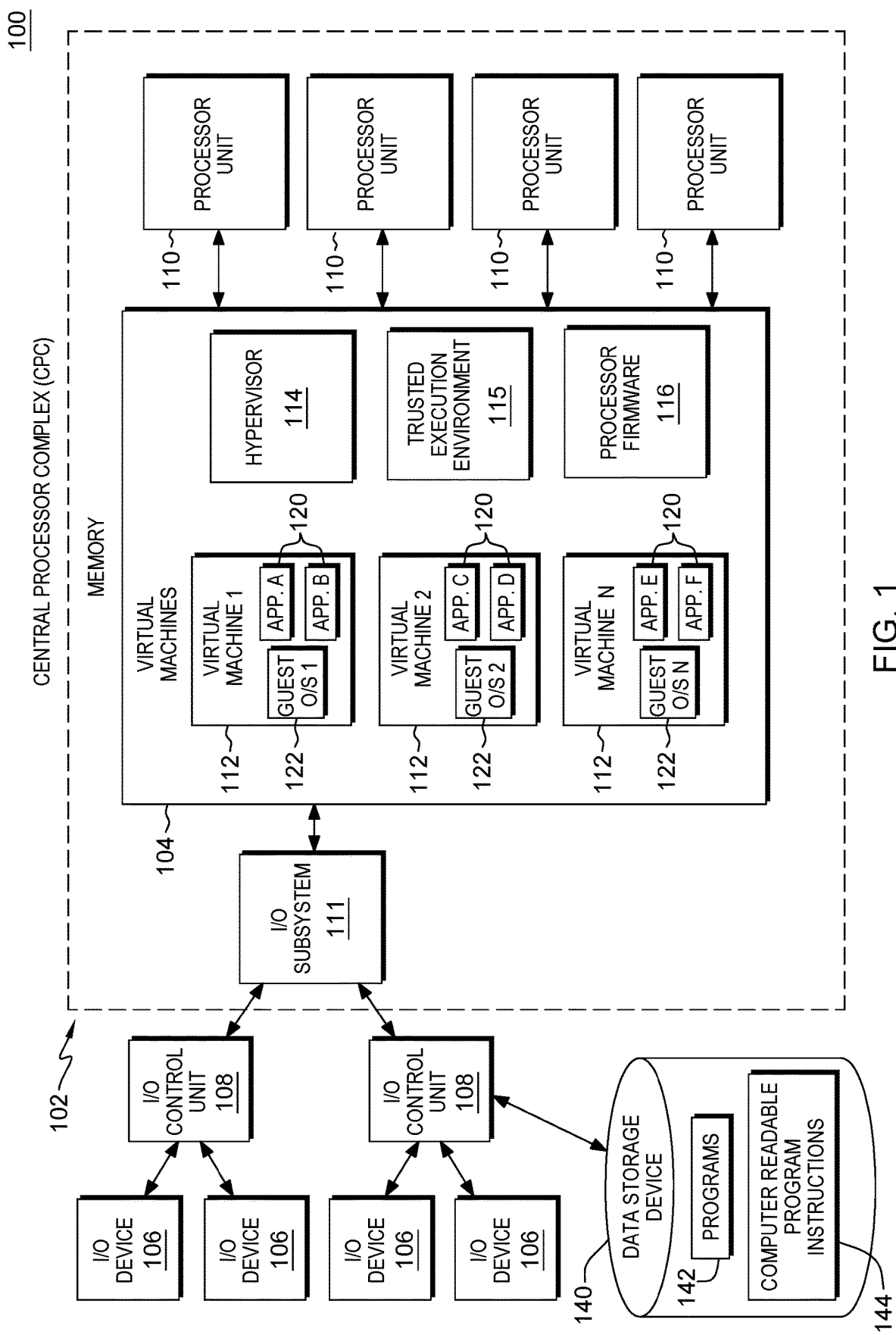
FIG. 1 depicts one example of a computing environment to incorporate and use one or more aspects of the present invention.

Referring to FIG. 1, in one example, a computing environment 100 includes a central processor complex (CPC) 102. Central processor complex 102 is, for instance, an IBM Z° server (or other server or machine offered by International Business Machines Corporation or other entities) and includes a plurality of components, such as, for instance, a memory 104 (a.k.a., system memory, main memory, main storage, central storage, storage) coupled to one or more processor units (also referred to as processors) 110 and to an input/output (I/O) subsystem 111. Example processor units 110 include one or more general-purpose processors (a.k.a., central processors or central processing units (CPUs)) and/or one or more other processors. IBM Z is a trademark or registered trademark of International Business Machines Corporation in at least one jurisdiction.

I/O subsystem 111 can be a part of the central processor complex or separate therefrom. It directs the flow of information between main storage 104 and input/output control units 108 and input/output (I/O) devices 106 coupled to the central processor complex.

Many types of I/O devices may be used. One particular type is a data storage device 140. Data storage device 140 can store one or more programs 142, one or more computer readable program instructions 144, and/or data, etc. The computer readable program instructions can be configured to carry out functions of embodiments of aspects of the invention.

Central processor complex 102 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central processor complex 102. Examples include, but are not limited to: microcode or millicode, device drivers, redundant processing units, external disk drive arrays, RAID systems, tape drives, and data archival storage systems, etc.

Further, central processor complex 102 can be operational with numerous other general-purpose or special-purpose computing system environments or configurations. Examples of well-known computing systems, environments, and/or configurations that may be suitable for use with central processor complex 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Central processor complex 102 provides, in one or more embodiments, virtualization support, in which memory 104 includes, for example, one or more virtual machines 112 (also referred to as guests), a virtual machine manager, such as a hypervisor 114, that manages the virtual machines, a trusted execution environment 115 (also referred to as an ultravisor) and processor firmware 116. One example of hypervisor 114 is the z/VM® hypervisor, offered by International Business Machines Corporation, Armonk, New York. The hypervisor is sometimes referred to as a host. z/VM is a trademark or registered trademark of International Business Machines Corporation in at least one jurisdiction.

In one or more embodiments, trusted execution environment 115 may be implemented, at least in part, in hardware and/or firmware configured to perform, for instance, processes such as described herein. The trusted execution environment is trusted firmware and/or hardware that makes use of memory-protection hardware to enforce memory protection. The owner of a guest can securely pass information (using, e.g., IBM Secure Execution) to the trusted execution environment by using a public host key, which is embedded in a host key document. To process the confidential information, the trusted execution environment uses a matching private host key. The private host key is specific to the server, e.g., the IBM Z® server, and is hardware protected.

Processor firmware 116 includes, e.g., the microcode or millicode of a processor. It includes, for instance, the hardware-level instructions and/or data structures used in implementation of higher-level machine code. In one embodiment, it includes, for instance, proprietary code that is typically delivered as microcode or millicode that includes trusted software, microcode or millicode specific to the underlying hardware and controls operating system access to the system hardware.

The virtual machine support of the central processor complex provides the ability to operate large numbers of virtual machines 112, each capable of operating with different programs 120 and running a guest operating system 122, such as the Linux® operating system. Each virtual machine 112 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 2:
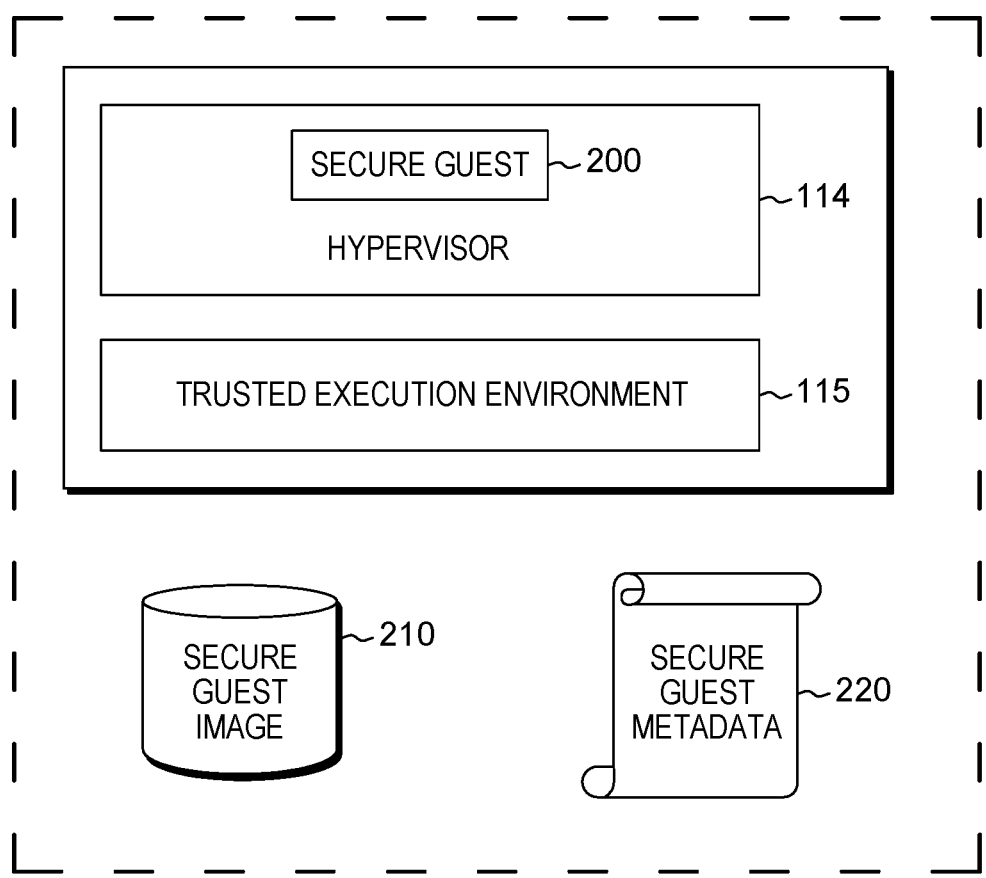
FIG. 2 depicts one example of a secure guest image and secure guest metadata used to start a secure guest, in accordance with one or more aspects of the present invention.

In one embodiment, one or more guests 112 are secure guests. Referring to FIG. 2, a secure guest 200 is started by a hypervisor (e.g., hypervisor 114) in a manner that the hypervisor cannot observe the state (e.g., memory, registers, etc.) of the secure guest. For instance, in one embodiment of confidential computing, the hypervisor can start/stop a secure guest, and the hypervisor knows where data used to start the secure guest is located but it cannot look into the running secure guest. Data used to load/start the secure guest may be encrypted in a manner that the hypervisor cannot see the secure guest. The owner of the secure guest image places confidential data in the secure guest metadata and then generates a secure guest image together with the secure guest metadata. After the secure guest is loaded, any interaction with the state of the secure guest is processed by a trusted execution environment, such as trusted execution environment 115.

In one embodiment, to start a secure guest, the hypervisor passes a secure guest image 210 and secure guest metadata 220 to trusted execution environment 115. The metadata is integrity and at least partially confidentially protected and is only interpreted by the trusted execution environment. Based on the information in the secure guest metadata, the trusted execution environment can then enforce the integrity of the secure guest image loaded into memory, protect the memory of the secure guest containing the loaded image from being accessible by the hypervisor and potentially decrypt the secure guest image before starting the secure guest.

The secure guest image and the secure guest metadata are cryptographically linked such that, e.g., only a subject with knowledge of confidential data protected by the secure guest metadata can perform a valid modification of the secure guest image. The secure guest metadata is designed to be exclusively interpretable by the trusted execution environment.

In accordance with one or more aspects of the present invention, the secure guest image (e.g., to be used to boot a secure guest) and metadata associated therewith may be updated. As examples, the image and metadata may be updated to apply fixes (e.g., security fixes) that affect the secure guest image, such that the secure guest image can be booted the next time with the fixes applied; to customize a generic secure guest image with confidential data belonging to a new owner of the customized secure guest image, such that the customized secure guest image can be booted, etc. Although examples for updating a secure guest image and metadata associated therewith are provided, additional, fewer and/or other examples may be provided.

In one example, the updating of a secure guest image and metadata associated therewith is based on a request provided via, for instance, an update request structure, an example of which is further described below. The update request structure (also referred to herein as an image update request structure or a request structure) is, for instance, integrity protected, and one or more parts of the request structure may be confidentially protected by, e.g., a request structure protection key. For instance, the request structure is AES-GCM (Advanced Encryption Standard-Galois Counter Mode) protected by a request structure protection key. It is integrity protected by the request structure protection key: e.g., CPK (customer public key)—a public ECDH (Elliptic-curve Diffie-Heilman) key from an ephemeral key pair—chosen by the customer, and a set of key slots describing the same request structure protection key chosen by the customer (e.g., request structure protection key used to AES-GCM protect the request structure).

The request structure is exclusively interpretable by the trusted execution environment (e.g., the trusted execution environment exclusively verifies the integrity of the request structure, and the encrypted part of the request structure is exclusively decrypted by the trusted execution environment). The request structure may include, for instance, one or more key slots, each containing a request structure protection key (RPK) protected by a host key of a target host/trusted execution environment; an indication of an image encryption key to be provided by the trusted execution environment function: either use the key used to encrypt the original (prior to updating) secure guest image or use a new random key—the option to use the original key may be restricted to requests that chose to use a protected key for image encryption; an indication of whether the image encryption key to be provided by the trusted execution environment function shall be a plain text key or a protected key (e.g., a key token whose plain text value is not visible to the secure guest but which can be interpreted as a cryptographic key by functions provided by trusted hardware/firmware of the system); and/or information as to which secure guest metadata attributes or confidential data shall be changed and how. The request structure may include additional, fewer and/or other data/attributes. Many possibilities exist.

One particular example of a description relating to an image update request structure is described with reference to FIG. 3. As shown in FIG. 3, in one example, a description 300 relating to a request structure (also referred to herein as request structure description 300) includes a plurality of entries 302, and each entry 302 has, for instance, a name 310, an abbreviation (abbrev) 312, and a short description of the entry (contents) 314, as well as a protection indication (protection) 316 of whether the contents (e.g., contents 314) are integrity protected or both integrity and confidentially protected (e.g., encrypted) by, e.g., a request protection key that can, e.g., only be obtained by a target system. In one example, contents 314 include the data/attributes of a request structure, and name 310, abbreviation 312 and protection indication 316 provide information relating to contents 314.

As an example, one entry 318 of the description of the request structure includes a customer public key (provided by the requesting entity), and one or more other entries 320 include key slots 1-N, each including a request structure protection key protected by a host key of a target host/trusted execution environment. The customer public key and the key slots are used to securely communicate to the trusted execution environment a request protection key (using, e.g., an (elliptic curve) Diffie-Hellman technique) of a set of possible target systems, in which each key slot addresses one target system.

One or more other entries 302 include, for instance, the following data encrypted by a request protection key:

Entry 322 includes one or more request flags (abbreviated RF), which may provide certain indications, such as a challenge indication (described below). In one example, an encrypted part of the request includes authentication data (e.g., data generated based on confidential data from the encrypted part of the secure guest metadata);

Entry 324 includes one or more change indications (e.g., one or more bits in a bitmap), which provide one or more types of changes (e.g., use new random image encryption keys, replace other confidential data of the original (pre-updated) secure guest metadata, modify control flags of the original secure guest metadata, etc.); and Entry 326 includes change data, which provides certain encrypted data depending on the change indications (e.g., key that shall replace keys from the original secure guest metadata).

Additional, less and/or other information may be included in image update request structure description 300. Additional, less and/or other entries may be provided, and/or each entry may have additional, less and/or other information. Further, an update request structure (e.g., contents 314) may include additional, fewer and/or other data/attributes. Many possibilities exist.

Figure 4:
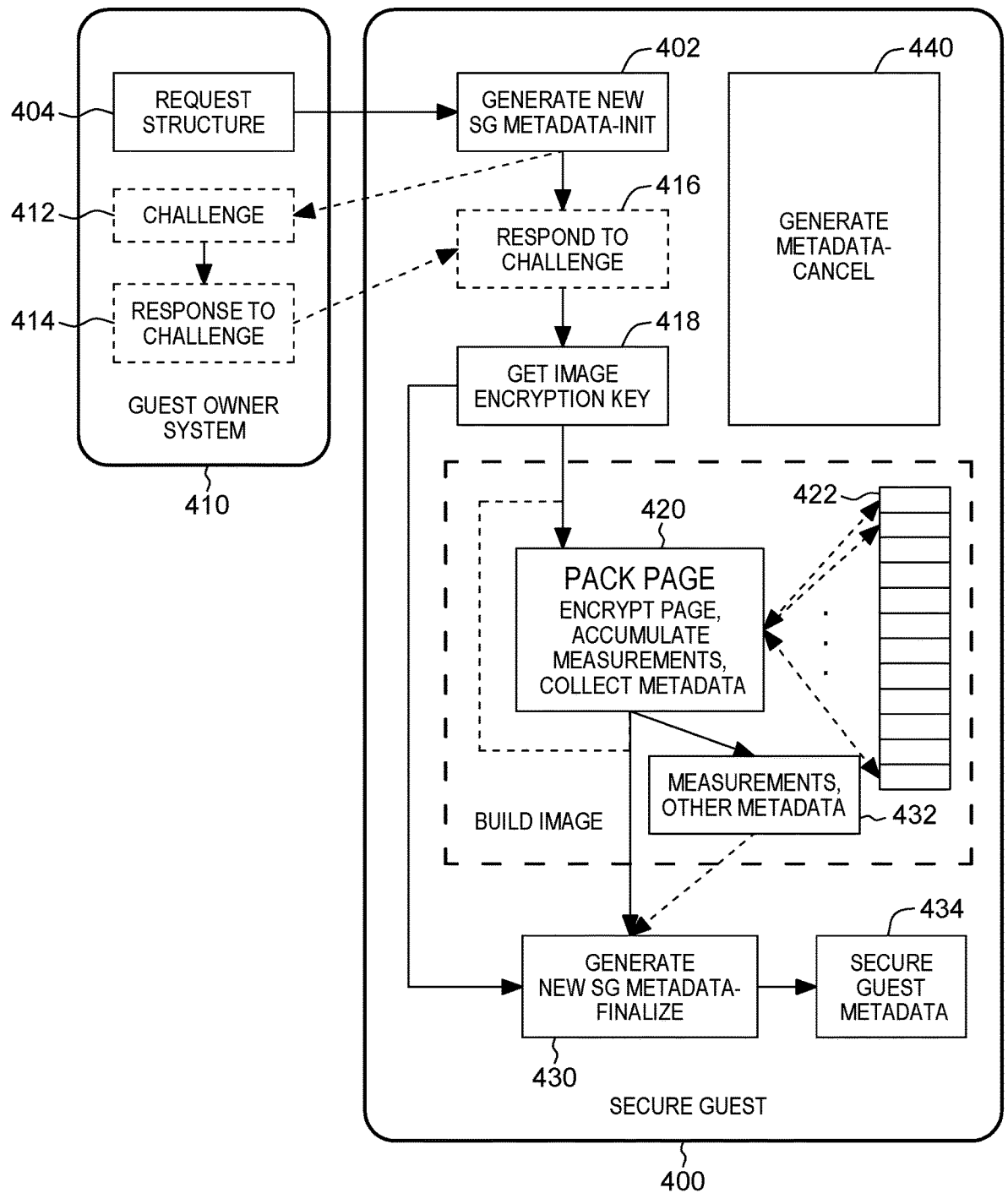
FIG. 4 depicts one example of generating an updated image of a secure guest and associated metadata, in accordance with one or more aspects of the present invention.

A request structure is used, in accordance with one or more aspects of the present invention, to generate an updated secure guest image and associated updated metadata. One example of this processing is described with reference to FIG. 4. In one example, a secure guest 400 issues a call, such as a generate secure guest metadata-initialize call 402, to a trusted execution environment to initialize updating of metadata associated with an image to be updated. The initialize call includes, for instance, a request structure 404 (e.g., having contents similar to contents 314), which was prepared external to the secure guest by, e.g., a secure guest owner 410, and obtained (e.g., provided, received, pulled, retrieved, etc.) by the secure guest. The call to the trusted execution environment returns to secure guest 400 a request handle, and optionally, may return a challenge of the validity of the request. The challenge received by the secure guest from the trusted execution environment is forwarded 412 to the secure guest owner. The secure guest owner computes a response to the challenge 414 based on the owner's knowledge of the secure guest metadata and the request structure, as described below, and sends the response to the secure guest. The secure guest receives the response from the secure guest owner and calls the trusted execution environment to respond to the challenge 416. If the challenge is unsuccessful, the update is cancelled. For instance, the secure guest calls the trusted execution environment using, e.g., a generate metadata-cancel call 440 to cancel the update. However, if the challenge is successful, the trusted execution environment changes to a state that allows to process further image update request functions associated with the request handle, and the update of the image and the metadata continues using the verified request handle.

To continue the update, in one example, secure guest 400 requests 418 an image encryption key (e.g., protected key) from the trusted execution environment for the request handle. The trusted execution environment provides, for instance, a protected key exclusively used by an instance of the secure guest calling the trusted execution environment. In this example, a plain text value of the encryption key is unknown to the secure guest.

Further, in one example, an updated image is generated inside the secure guest and the image is encrypted with the updated image encryption key. To update the image, in one example, the secure guest supplies the updates (e.g., security fixes, configuration changes, etc.) to the secure guest using update techniques (e.g., using Red Hat Package Manager (RPM) update functions) and then extracts the updated image using standard image generation tools (e.g., Dracut). The updated image is encrypted and written to a disk or boot partition, as examples, such that it can be used to boot a secure guest based on the updated secure guest image.

As part of the updating, in one example, a pack operation 420 is performed for each page 422 (or other unit) of memory that is part of the updated secure guest image. For each page, the pack operation includes, for instance, encrypting the page using the image encryption key (e.g., protected key); accumulating measurements (e.g., integrity measurements, such as a hash, a verification code (e.g., a message authentication code), a signature, etc., computed based on techniques now known or later developed) of the updated secure guest image; and updating other metadata of the updated secure guest image (e.g., start address of updated secure guest image; number of pages of updated secure guest image, etc.).

Further, the secure guest issues to the trusted execution environment a generate new secure guest metadata-finalize call 430, which includes, as input, select data including measurements of the updated secure guest image and other metadata of the secure guest image 432, and returns updated secure guest metadata 434.

In one example, the updated secure guest image together with the updated secure guest metadata are stored to a boot device, replacing the old image and metadata.

Figure 5A:
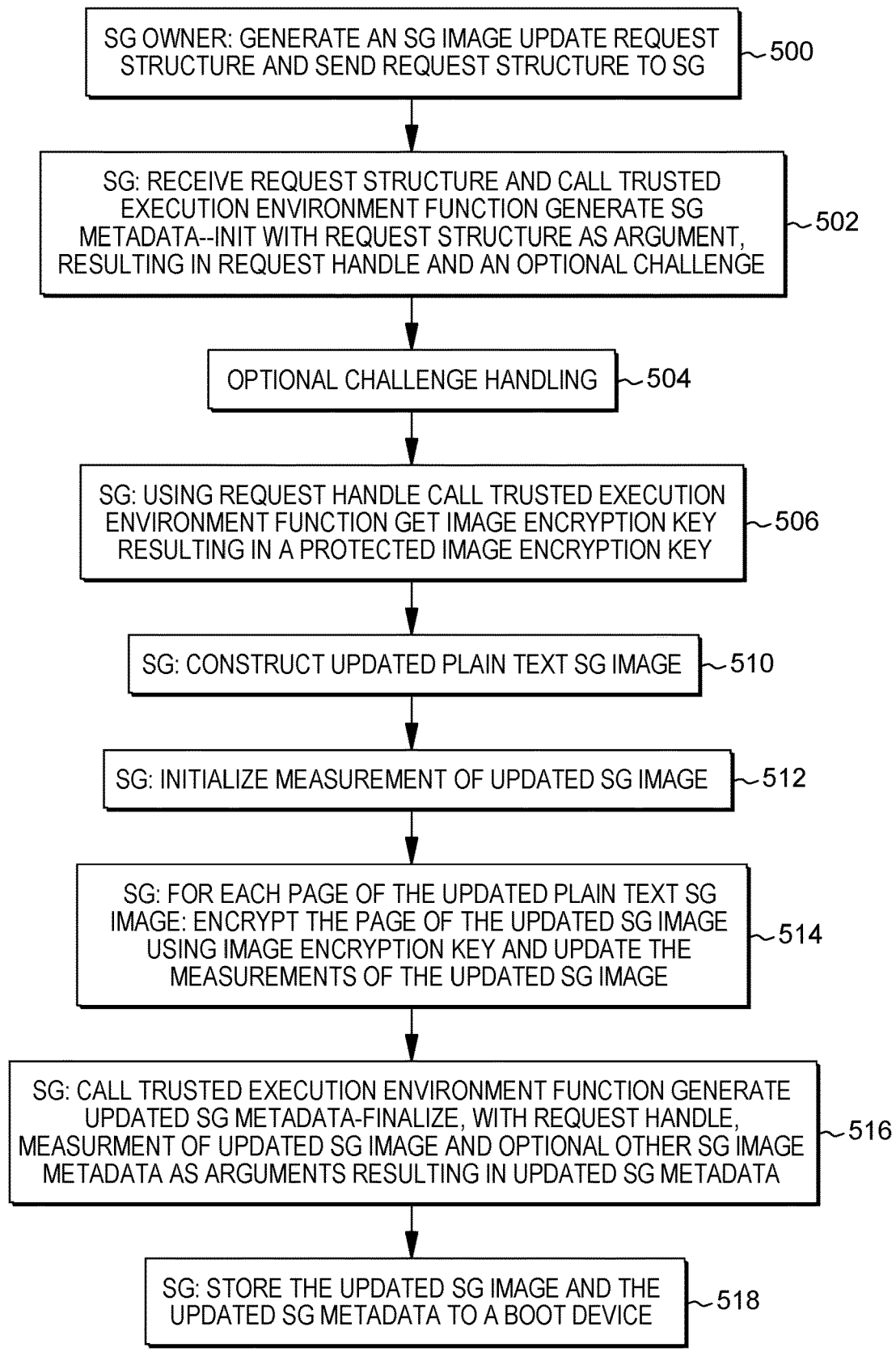
FIGS. 5A-5B depict one example of a generation process to generate an updated secure guest image and updated secure guest metadata, in accordance with one or more aspects of the present invention.

Further details of one embodiment of generating an updated image and updated metadata are described with reference to FIGS. 5A-5B. Referring initially to FIG. 5A, a secure guest owner generates a secure guest image update request structure, the contents of which are similar to, e.g., contents 314, and sends the request structure to the secure guest 500. The secure guest receives the request structure and calls a trusted execution environment function, referred to as generate secure guest metadata call-init, with the request structure as an argument. The trusted execution environment obtains (e.g., receives, is provided, retrieves, pulls, etc.) the call and returns a request handle 502. Optionally, it may also return a challenge to enable the owner of the secure guest to indicate the validity of the request, which may affect the validity of the request handle.

To further describe, in one embodiment, the initialize function is callable (e.g., only) from a secure guest and, as indicated, takes a secure guest image update request structure as an argument. The call is to the trusted execution environment that, based on the call, unpacks (e.g., decrypts) the request structure using, e.g., a customer public key (e.g., described in entry 318) and one or more key slots (e.g., described in entries 320) of the request structure. It derives a request structure protection key, decrypts the request structure using the request structure protection key and verifies the integrity of the request structure (e.g., using one or more measurements, such as computing a hash, a message authentication code, a cryptographic signature, etc.). If the original image requires authentication for the secure guest metadata computation, the authentication data is verified using confidential data (e.g., a key, password, etc.) from the original (e.g., prior to update) secure guest metadata.

If the initialize function indicates a challenge is to be performed, then a challenge function is requested 504. If the challenge is optionally selected, a challenge indication is returned by the trusted execution environment and a wait for challenge state is associated with the request handle. The challenge may contain, for instance, a nonce, a hash of the public host key of the host, a timestamp of the request, a timestamp of the boot time (verify unpacked image) of the secure guest and data unique to the secure guest image or the secure guest. One embodiment of performing the challenge is described with reference to FIG. 5B.

Figure 5B:
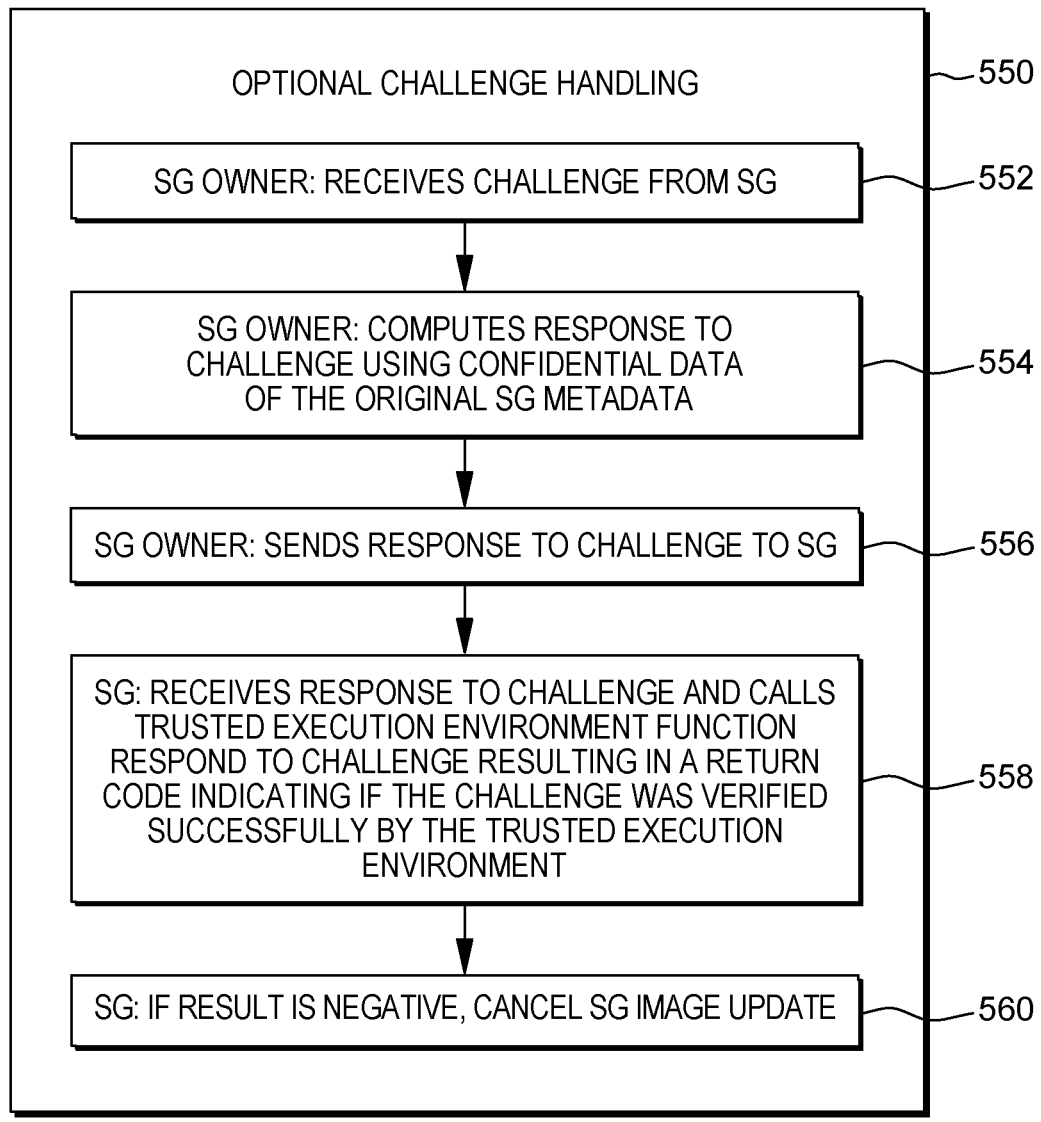

Referring to FIG. 5B, in one embodiment, a challenge handling process 550 includes, for instance, a secure guest owner receiving a challenge from the secure guest 552. The secure guest owner computes a response to the challenge using confidential data (e.g., key, password, etc.) of the original (pre-updated) secure guest metadata 554. The secure guest owner sends a response to the challenge to the secure guest 556. The secure guest receives the response to the challenge and calls a trusted execution environment function, referred to as respond to challenge, which results in a return code indicating whether the challenge was successfully verified by the trusted execution environment 558. In one example, the respond to challenge function is callable from the guest and the call includes the request handle and a response to the challenge as arguments. The trusted execution environment evaluates if the response is equal to an encryption of the challenge with confidential data of the original secure guest metadata, and if so, the initialized state is associated with the request handle.

The secure guest determines whether the challenge failed and if so, it cancels the secure guest image update 560. For instance, it calls a trusted execution environment function, referred to as generate secure guest metadata-cancel. In one example, this function is callable from a secure guest and includes the request handle as an argument. The cancel operation invalidates the request handle.

Subsequent to successfully performing the challenge, if any, processing returns to generating the secure guest image and metadata of FIG. 5A. Based on successfully performing the challenge, or if the challenge is not selected, an initialized state is associated with the request handle.

The secure guest uses the request handle to call a trusted execution environment function, referred to as get image encryption key, which results in, e.g., a protected image encryption key being provided. In one example, the get image encryption key function is callable from a secure guest and has the request handle as an argument. The trusted execution environment evaluates whether the request referred to by the request handle is in a state where the protected image encryption key can be returned (e.g., challenge was passed). Depending on the request, the trusted execution environment either fetches the old image encryption key or generates a new image encryption key (e.g., a random key). If protected keys (as, for example, CPACF (Central Processor Assist for Cryptographic Functions) protected keys available on IBM Z computers) are to be used, the image encryption key is to be transformed into a protected key usable by the calling secure guest. The image encryption keys (e.g., protected keys) are returned.

The secure guest constructs an updated plain text secure guest image 510 and initializes measurement of the updated secure guest image 512. The secure guest image includes one or more pages (or other units) of memory, and for each page, the secure guest encrypts the page of the updated secure guest image using the protected image encryption key and updates the measurement(s) of the updated secure guest image 514.

The secure guest calls a trusted execution environment function, referred to as generate new secure guest metadata-finalize, which includes as arguments the request handle, measurement(s) of the updated secure guest image and optional other secure guest image metadata and returns updated secure guest metadata 516. The updated secure guest metadata includes, for instance, a new version if requested, a new random initialization value, replacement of secure guest image measurements, replacement of image keys if requested, and replacement of previous other secure guest metadata.

The secure guest stores the updated secure guest image and metadata to a boot device 518, replacing any old image and metadata.

As described herein, in one or more aspects, a process to update an image of a secure guest includes, for instance, receiving, by a secure guest, an update request from the secure guest image owner; calling, by the secure guest, a trusted execution environment function to initialize the image update request; optionally, receiving, by the secure guest from the trusted execution environment, a challenge to the image update request, which is provided to the secure guest owner; receiving a response, by the secure guest from the secure guest owner, and providing the response to the trusted execution environment, which verifies, based on the response, the image update request; generating, by the secure guest, based on successfully verifying the image update request, an updated secure guest image; performing measurements of the updated secure guest image; encrypting the updated secure guest image using an encryption key; calling the trusted execution environment to generate updated secure guest metadata, based on the measurements of the updated secure guest; and storing the encrypted updated secure guest image and updated metadata to a boot device, replacing the old image.

In one example, an image update request structure provided in the update request is integrity protected and includes an encrypted part. It is targeted to one or more systems with a trusted execution domain such that only a targeted trusted execution environment can verify the integrity of the request structure and only a targeted trusted execution environment can decrypt the encrypted part of the request structure.

In one example, integrity protected metadata of the secure guest includes control information that is usable in determining whether an image update of the secure guest is allowed and to indicate the types of image updates allowed.

One or more aspects of the present invention are inextricably tied to computer technology and facilitate processing within a computer, improving performance thereof. Processing is facilitated by enabling an update of a secure guest image from within a running secure guest and generating secure guest metadata for the updated secure guest image.

Further details of one embodiment of facilitating processing within a computing environment, as it relates to one or more aspects of the present invention, are described with reference to FIGS. 6A-6C.

Referring to FIG. 6A, in one embodiment, a secure guest generates an updated image for the secure guest 600, and one or more measurements for the updated image are computed 602. The secure guest provides the one or more measurements to a trusted execution environment 604 and obtains from the trusted execution environment metadata for the updated image, in which the metadata is generated based on metadata of the secure guest and obtaining the one or more measurements 606. By generating an updated secure guest image and obtaining metadata associated therewith for a running secure guest, changes may be made to the secure guest (e.g., applying security fixes, updating a configuration, etc.) that will be available to the secure guest at the next boot, providing flexibility and/or enhancements.

In one example, the secure guest obtains an image update request structure indicating the updated image is to be generated 608. The image update request structure is provided to the trusted execution environment 610, and a request handle is obtained from the trusted execution environment, based on the image update request structure 612. The request handle is to be used in generating the updated image 614.

In one example, the generating the updated image includes using the request handle to request an encryption key from the trusted execution environment 616, constructing an updated plain text image of the secure guest 618, and encrypting the updated plain text image using the encryption key to obtain an encrypted image, the encrypted image being the updated image 620.

As an example, the computing the one or more measurements includes updating, based on the encrypted image, one or more initial measurements of the updated plain text image to obtain the one or more measurements provided to the trusted execution environment 622. The one or more measurements are provided, for instance, with the request handle 624.

In one example, referring to FIG. 6B, the encryption key is a protected key obtained from the trusted execution environment 630. The protected key is, for instance, to be exclusively used by an instance of the secure guest calling the trusted execution environment and a plain text value of the encryption key is unknown to the secure guest 632. Using a protected key provides security for the data and the processing.

As an example, the updated plain text image includes a plurality of pages of memory 634, and the encrypting the updated plain text image includes encrypting the plurality of pages of memory using the protected key 636.

In one example, the obtaining the metadata for the updated image is based on calling a function at the trusted execution environment to create the metadata for the updated image 638, and the calling provides as arguments the request handle and the one or more measurements 640. As an example, the arguments further include other metadata of the updated image 642.

As an example, the image update request structure is integrity protected, includes an encrypted part, and is exclusively interpretable by the trusted execution environment 644. The protection ensures that the request structure cannot be modified during the transmission from the secure guest to the trusted execution environment, that the data in the encrypted part of the request structure remains confidential during transmission and that the plain text values of the encrypted data can only be accessed by the trusted execution environment.

In one example, referring to FIG. 6C, the encrypted part of the image update request structure includes data derived from confidential data in an encrypted part of the metadata of the secure guest issuing an image update request 660. Using this data from the image update request structure the trusted execution environment can verify that the creator of the request structure has knowledge that is assumed to be exclusive to the owner of the secure guest image.

Further, in one example, a challenge to the image update request structure is obtained from the trusted execution environment based on providing the image update request structure to the trusted execution environment 662. The challenge is, for instance, based on confidential data obtained from an encrypted part of the image update request structure 664. The secure guest obtains from a selected entity, a response to the challenge 666, and provides to the trusted execution environment the response to the challenge 668. Based on providing the response to the challenge, an indication of whether the challenge was successful is obtained from the trusted execution environment 670. Based on the challenge being successful, continuing with generating the updated image 672. In one example, the call to the trusted execution environment to provide the response may include the request handle as an additional argument. The challenge protects against vulnerabilities against the image update request structure. If, for instance, the challenge was unsuccessful or as long as the challenge has not been answered with a valid response, the trusted execution environment does not accept the final call to generate the metadata for the updated image.

In one example, the image update request structure includes one or more indications and data that specify one or more changes to previous secure guest metadata to be used to compute the metadata for the updated image 674.

As an example, the updated image of the secure guest and the metadata for the updated image are stored to a boot device 676. This enables the updated image and metadata to be available during a boot process.

Other variations and embodiments are possible.

Figure 7A:
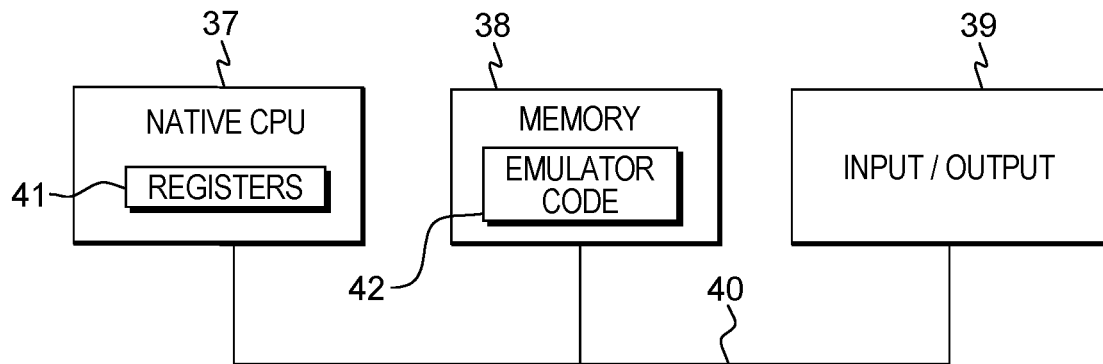
FIG. 7A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 7A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, New York; an HP Superdome with Intel® Itanium® II processors offered by Hewlett Packard Co., Palo Alto, California; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as PowerPC processors, HP Superdome servers or others, to emulate the z/Architecture instruction set architecture and to execute software and instructions developed based on the z/Architecture instruction set architecture.

Figure 7B:
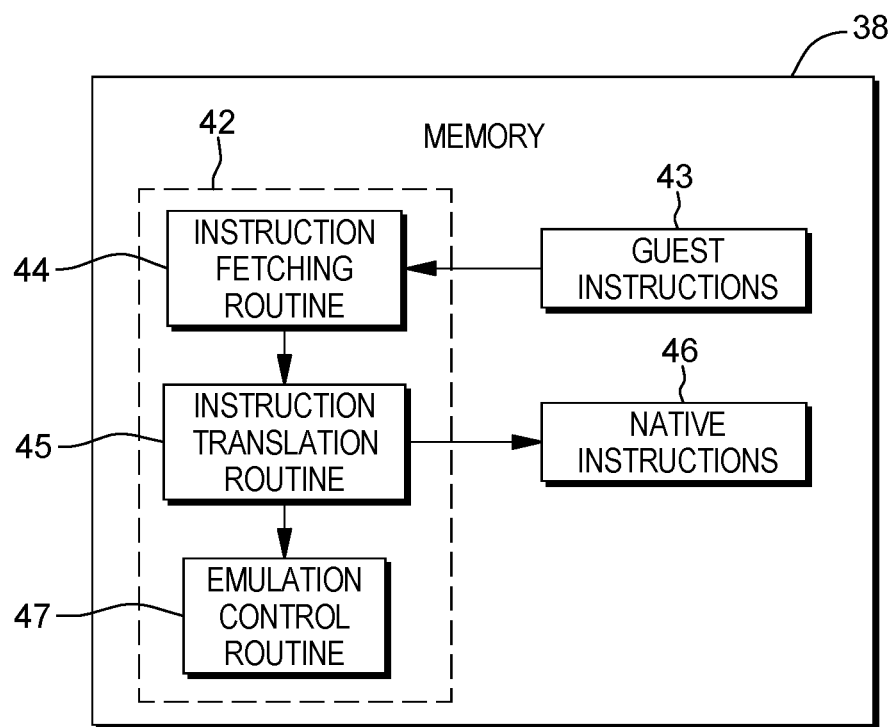
FIG. 7B depicts further details of the memory of FIG. 7A, in accordance with one or more aspects of the present invention.

Further details relating to emulator code 42 are described with reference to FIG. 7B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An instruction, command or call that may be emulated includes the trusted execution environment calls described herein, in accordance with one or more aspects of the present invention. Further, other instructions, commands, functions, operations, calls and/or one or more aspects of the present invention may be emulated, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
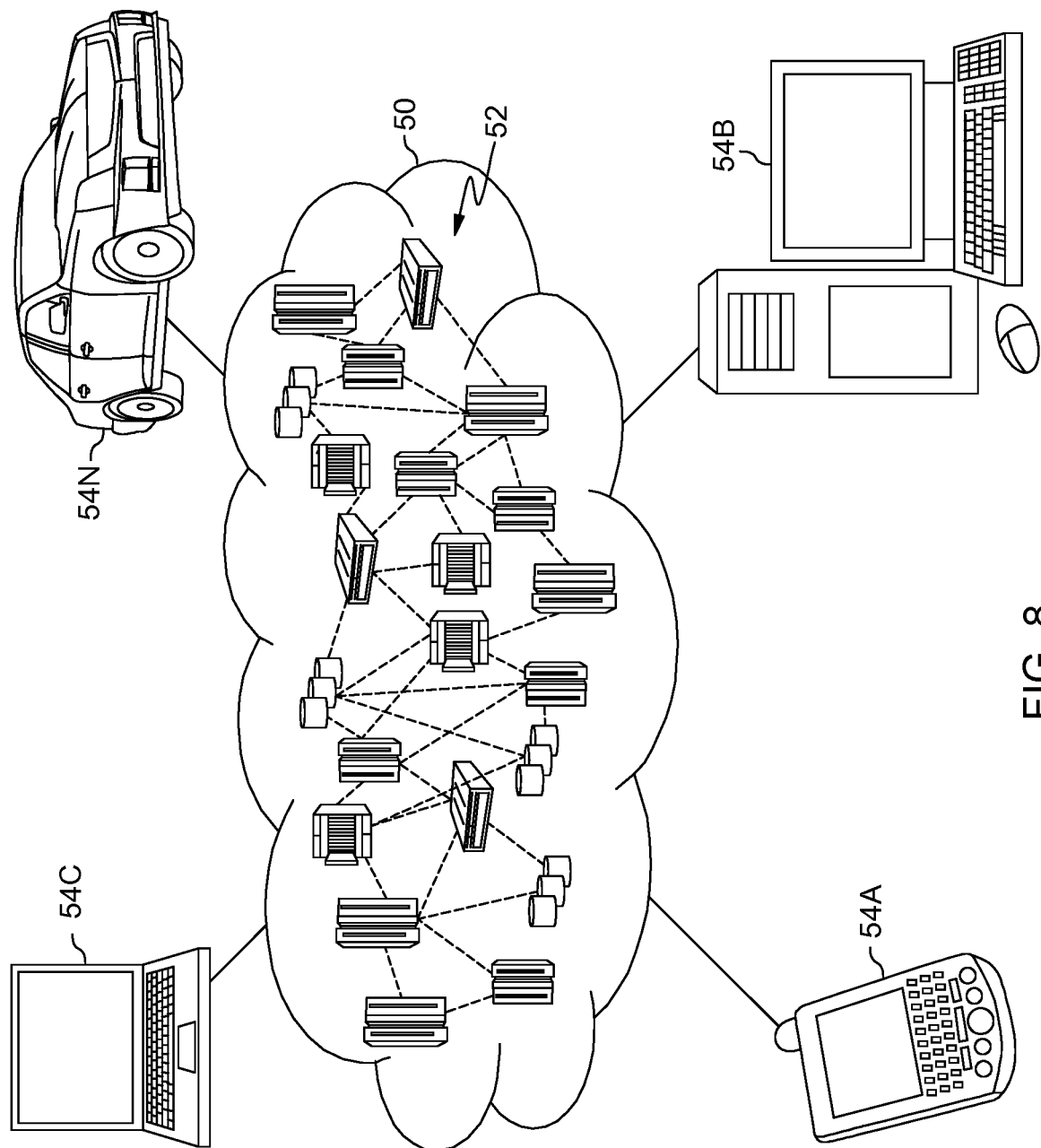
FIG. 8 depicts one embodiment of a cloud computing environment, in accordance with one or more aspects of the present invention.

Referring now to FIG. 8, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 9:
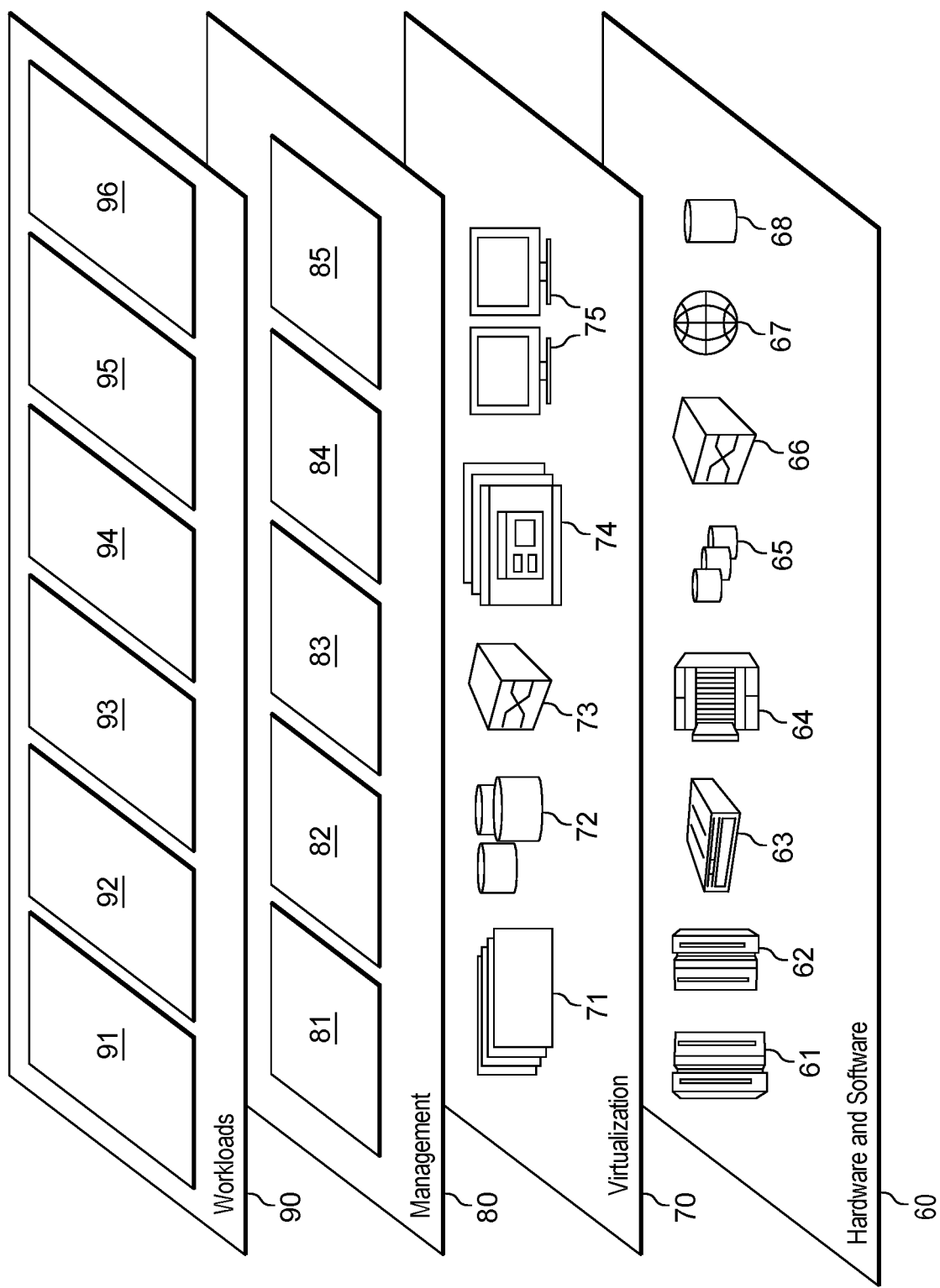
FIG. 9 depicts one example of abstraction model layers, in accordance with one or more aspects of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure guest image and metadata update processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions, commands, functions, calls and/or operations may be used. Additionally, different types of structures may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   one or more computer readable storage media and program instructions collectively stored on the one or more computer readable storage media to perform the following operations comprising:
   generating, by a secure guest, an updated image for the secure guest;
   computing, by the secure guest, one or more measurements for the updated image;
   providing, by the secure guest, the one or more measurements to a trusted execution environment; and
   obtaining from the trusted execution environment metadata for the updated image, the metadata generated based on metadata of the secure guest and obtaining the one or more measurements.

2. The computer program product of claim 1, wherein the operations further comprise:
   obtaining, by the secure guest, an image update request structure indicating the updated image is to be generated;
   providing the image update request structure to the trusted execution environment; and
   obtaining from the trusted execution environment, based on the image update request structure, a request handle, the request handle to be used in generating the updated image.

3. The computer product of claim 2, wherein the generating the updated image comprises:
   using the request handle to request an encryption key from the trusted execution environment;
   constructing an updated plain text image of the secure guest;

encrypting the updated plain text image using the encryption key to obtain an encrypted image, the encrypted image being the updated image; and wherein the computing the one or more measurements comprises updating, based on the encrypted image, one or more initial measurements of the updated plain text image to obtain the one or more measurements provided to the trusted execution environment, the one or more measurements provided with the request handle.

4. The computer program product of claim 3, wherein the encryption key is a protected key obtained from the trusted execution environment, wherein the protected key is to be exclusively used by an instance of the secure guest calling the trusted execution environment and a plain text value of the encryption key is unknown to the secure guest.

5. The computer program product of claim 4, wherein the updated plain text image includes a plurality of pages of memory, and wherein the encrypting the updated plain text image includes encrypting the plurality of pages of memory using the protected key.

6. The computer program product of claim 2, wherein the obtaining the metadata for the updated image is based on calling a function at the trusted execution environment to create the metadata for the updated image, the calling providing as arguments the request handle and the one or more measurements.

7. The computer program product of claim 6, wherein the arguments further include other metadata of the updated image.

8. The computer program product of claim 2, wherein the image update request structure is integrity protected, includes an encrypted part, and is exclusively interpretable by the trusted execution environment.

9. The computer program product of claim 8, wherein the encrypted part of the image update request structure includes data derived from confidential data in an encrypted part of the metadata of the secure guest issuing an image update request.

10. The computer program product of claim 2, wherein the operations further comprise:
obtaining a challenge to the image update request structure from the trusted execution environment based on providing the image update request structure to the trusted execution environment, the challenge based on confidential data obtained from an encrypted part of the image update request structure;
obtaining, by the secure guest from a selected entity, a response to the challenge;
providing from the secure guest to the trusted execution environment the response to the challenge;
obtaining from the trusted execution environment, based on providing the response to the challenge, an indication of whether the challenge was successful; and
continuing with generating the updated image based on the challenge being successful.

11. The computer program product of claim 2, wherein the image update request structure includes one or more indications and data that specify one or more changes to previous secure guest metadata to be used to compute the metadata for the updated image.

12. The computer program product of claim 1, wherein the operations further comprise storing the updated image of the secure guest and the metadata for the updated image to a boot device.

13. A computer system for facilitating processing within a computing environment, the computer system comprising:
a memory; and
at least one processor in communication with the memory, wherein the computer system is configured to perform the following operations comprising:
generating, by a secure guest, an updated image for the secure guest;
computing, by the secure guest, one or more measurements for the updated image;
providing, by the secure guest, the one or more measurements to a trusted execution environment; and
obtaining from the trusted execution environment metadata for the updated image, the metadata generated based on metadata of the secure guest and obtaining the one or more measurements.

14. The computer system of claim 13, wherein the operations further comprise:
obtaining, by the secure guest, an image update request structure indicating the updated image is to be generated;
providing the image update request structure to the trusted execution environment; and
obtaining from the trusted execution environment, based on the image update request structure, a request handle, the request handle to be used in generating the updated image.

15. The computer system of claim 14, wherein the generating the updated image comprises:
using the request handle to request an encryption key from the trusted execution environment;
constructing an updated plain text image of the secure guest;
encrypting the updated plain text image using the encryption key to obtain an encrypted image, the encrypted image being the updated image; and
wherein the computing the one or more measurements comprises updating, based on the encrypted image, one or more initial measurements of the updated plain text image to obtain the one or more measurements provided to the trusted execution environment, the one or more measurements provided with the request handle.

16. The computer system of claim 14, wherein the obtaining the metadata for the updated image is based on calling a function at the trusted execution environment to create the metadata for the updated image, the calling providing as arguments the request handle and the one or more measurements.

17. A computer-implemented method of facilitating processing within a computing environment, the computer-implemented method comprising:
generating, by a secure guest, an updated image for the secure guest;
computing, by the secure guest, one or more measurements for the updated image;
providing, by the secure guest, the one or more measurements to a trusted execution environment; and
obtaining from the trusted execution environment metadata for the updated image, the metadata generated based on metadata of the secure guest and obtaining the one or more measurements.

18. The computer-implemented method of claim 17, further comprising:
obtaining, by the secure guest, an image update request structure indicating the updated image is to be generated;
providing the image update request structure to the trusted execution environment; and obtaining from the trusted execution environment, based on the image update request structure, a request handle, the request handle to be used in generating the updated image.

19. The computer-implemented method of claim 18, wherein the generating the updated image comprises:
   using the request handle to request an encryption key from the trusted execution environment;
   constructing an updated plain text image of the secure guest;
   encrypting the updated plain text image using the encryption key to obtain an encrypted image, the encrypted image being the updated image; and
   wherein the computing the one or more measurements comprises updating, based on the encrypted image, one or more initial measurements of the updated plain text image to obtain the one or more measurements provided to the trusted execution environment, the one or more measurements provided with the request handle.

20. The computer-implemented method of claim 18, wherein the obtaining the metadata for the updated image is based on calling a function at the trusted execution environment to create the metadata for the updated image, the calling providing as arguments the request handle and the one or more measurements.

21. A computer program product for facilitating processing within a computing environment, the computer program product comprising:
   one or more computer readable storage media and program instructions collectively stored on the one or more computer readable storage media to perform the following operations comprising:
      obtaining, by a secure guest, an image update request structure indicating an updated image for the secure guest is to be generated;
      providing the image update request structure to a trusted execution environment;
      obtaining from the trusted execution environment, based on the image update request structure, a request handle, the request handle to be used in generating the updated image;
      generating, by the secure guest, the updated image for the secure guest;
      computing one or more measurements for the updated image;
      providing, by the secure guest, the one or more measurements to the trusted execution environment; and
      obtaining from the trusted execution environment metadata for the updated image, the metadata generated based on metadata of the secure guest and obtaining the one or more measurements.

22. The computer product of claim 21, wherein the generating the updated image comprises:
   using the request handle to request an encryption key from the trusted execution environment;
   constructing an updated plain text image of the secure guest;
   encrypting the updated plain text image using the encryption key to obtain an encrypted image, the encrypted image being the updated image; and
   wherein the computing the one or more measurements comprises updating, based on the encrypted image, one or more initial measurements of the updated plain text image to obtain the one or more measurements provided to the trusted execution environment, the one or more measurements provided with the request handle.

23. The computer program product of claim 21, wherein the image update request structure is integrity protected, includes an encrypted part, and is exclusively interpretable by the trusted execution environment.

24. A computer-implemented method of facilitating processing within a computing environment, the computer-implemented method comprising:
   generating, by a secure guest, an updated image for the secure guest;
   computing one or more measurements for the updated image;
   providing, by the secure guest, the one or more measurements to a trusted execution environment;
   obtaining from the trusted execution environment metadata for the updated image, the metadata generated based on metadata of the secure guest and obtaining the one or more measurements; and
   storing the updated image of the secure guest and the metadata for the updated image to a boot device.

25. The computer-implemented method of claim 24, wherein the obtaining the metadata for the updated image is based on calling a function at the trusted execution environment to create the metadata for the updated image, the calling providing as arguments a request handle and the one or more measurements, the request handle obtained from the trusted execution environment and to be used in generating the updated image.

\* \* \* \* \*